(12) United States Patent
Roychowdhury

(10) Patent No.: US 12,292,788 B2
(45) Date of Patent: May 6, 2025

(54) METHOD AND SYSTEM FOR AUTOMATICALLY IDENTIFYING AND RESOLVING ERRORS IN LOG FILE

(71) Applicant: JPMorgan Chase Bank, N.A., New York, NY (US)

(72) Inventor: Sukla Roychowdhury, Kolkata (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 23 days.

(21) Appl. No.: 18/198,483

(22) Filed: May 17, 2023

(65) Prior Publication Data

US 2023/0376375 A1  Nov. 23, 2023

(30) Foreign Application Priority Data

May 21, 2022  (IN) .............................. 202211029336

(51) Int. Cl.
*G06F 11/00* (2006.01)
*G06F 11/07* (2006.01)

(52) U.S. Cl.
CPC ...... *G06F 11/0793* (2013.01); *G06F 11/0721* (2013.01); *G06F 11/0787* (2013.01)

(58) Field of Classification Search
CPC ............. G06F 11/0793; G06F 11/0721; G06F 11/0787; G06F 11/0751; G06F 11/0778; G06F 11/079; G06F 11/3476; G06N 20/00
USPC ....................................................... 714/1-57
See application file for complete search history.

(56) References Cited

U.S. PATENT DOCUMENTS

| | | | |
|---|---|---|---|
| 9,189,317 B1* | 11/2015 | Marimuthu | G06F 11/3065 |
| 2008/0126878 A1* | 5/2008 | Best | G06F 11/3636 |
| | | | 714/E11.181 |
| 2011/0055620 A1* | 3/2011 | Sengupta | G06F 16/93 |
| | | | 714/37 |
| 2011/0113287 A1* | 5/2011 | Gururaj | G06F 11/0706 |
| | | | 714/E11.029 |
| 2011/0126095 A1* | 5/2011 | Brock | H04L 69/40 |
| | | | 715/764 |
| 2015/0067410 A1* | 3/2015 | Kumar | G06F 11/004 |
| | | | 714/47.3 |
| 2015/0331766 A1* | 11/2015 | Sarfare | G06F 11/2035 |
| | | | 714/4.11 |
| 2016/0092787 A1* | 3/2016 | Gadde | G06N 5/02 |
| | | | 706/12 |
| 2020/0285939 A1* | 9/2020 | Baker | G06N 7/01 |
| 2021/0200612 A1* | 7/2021 | Martyanov | G06F 40/279 |
| 2021/0326197 A1* | 10/2021 | Honnappa | G06N 5/022 |
| 2023/0039566 A1* | 2/2023 | Ghag | G06F 11/0736 |
| 2023/0273849 A1* | 8/2023 | Mahindru | G06F 11/0778 |
| | | | 714/37 |

* cited by examiner

*Primary Examiner* — Sarai E Butler
(74) *Attorney, Agent, or Firm* — GREENBLUM & BERNSTEIN, P.L.C.

(57) ABSTRACT

A method and a system for automatically identifying and resolving at least one error in at least one log file are provided. The method includes receiving, via a communication interface, the at least one log file from at least one log store. The method further includes identifying, using a first trained model, the at least one error in the at least one log file. Next, the method includes classifying the at least one error into a first category of errors and a second category of errors. Thereafter, the method includes automatically resolving, using a second trained model, the first category of errors in the at least one log file.

17 Claims, 5 Drawing Sheets

METHOD AND SYSTEM FOR AUTOMATICALLY IDENTIFYING AND RESOLVING ERRORS IN LOG FILE

CROSS-REFERENCE TO RELATED APPLICATIONS

This application claims the benefit of priority from Indian Patent Application No. 202211029336, filed May 21, 2022, which is herein incorporated by reference in its entirety.

FIELD OF THE DISCLOSURE

This technology generally relates to methods and systems for error handling and logging, and more particularly to methods and systems for automatically identifying and resolving at least one error in at least one log file using machine learning techniques.

BACKGROUND INFORMATION

The following description of the related art is intended to provide background information pertaining to the field of the present disclosure. This section may include certain aspects of the art that may be related to various features of the present disclosure. However, it should be appreciated that this section is used only to enhance the understanding of the reader with respect to the present disclosure, and not as admissions of the prior art.

It is known that several organizations use software applications for operation of various tasks. These software applications may have errors, exceptions or bugs that hinder operation of tasks during execution of the software applications. When an error is encountered while running an application, the production support team steps in to resolve the error by identifying the error in the log files and then analyzing the same. After analysis of the error, the production support team works to identify the fixes and then proceed to execute the fixes and resolve the errors or exceptions.

One drawback of the conventional process of fixing errors in applications by the production support team is the excessive consumption of time. The whole process from identification of the error by the production support team to the resolution of the error by the production support team takes a significant amount of time that can be better invested in more critical issues. It is important for the production support team to save time by not spending it on any regular or commonly occurring errors that may be fixed easily through simple solutions that include but are not limited to data fixes and code fixes.

Hence, in view of these and other existing limitations, there arises an imperative need to provide an efficient solution to overcome the above-mentioned limitations and to provide a method and system to automatically resolve common or known errors in the application log files.

SUMMARY

The present disclosure, through one or more of its various aspects, embodiments, and/or specific features or sub-components, provides, inter alia, various systems, servers, devices, methods, media, programs, and platforms for automatically identifying and resolving errors in the log file of the applications.

According to an aspect of the present disclosure, a method for automatically identifying and resolving at least one error in at least one log file is disclosed. The method is implemented by at least one processor. The method may include receiving, by the at least one processor via a communication interface, the at least one log file from at least one log store. Next, the method includes identifying, by the at least one processor using a first trained model, the at least one error in the at least one log file. Next, the method includes classifying, by the at least one processor, the at least one error into a first category of errors and a second category of errors. Thereafter, the method includes automatically resolving, by the at least one processor using a second trained model, the first category of errors in the at least one log file.

In accordance with an exemplary embodiment, each of the first trained model and the second trained model corresponds to a machine learning model.

In accordance with an exemplary embodiment, the first trained model is trained by seeding a plurality of errors in an error store database, and the second trained model is trained by seeding a plurality of error fixes for a plurality of known errors in an error fix store database.

In accordance with an exemplary embodiment, the at least one error is classified into the first category of errors and the second category of errors based on at least one from among complexity of errors, resolution of errors, type of errors, criticality of errors, weightage of errors, availability of possible fixes of errors, past seeded errors, frequency of occurrence of errors or any combination thereof.

In accordance with an exemplary embodiment, the first category of errors includes prime errors that are resolved automatically using the second trained model.

In accordance with an exemplary embodiment, the method includes alerting, by the at least one processor, at least one entity in an event at least one random error occurs while resolving the first category of errors in the at least one log file.

In accordance with an exemplary embodiment, the second category of errors includes complex errors that require manual intervention for the resolution of errors.

According to another aspect of the present disclosure, a computing device configured to implement an execution of a method for automatically identifying and resolving at least one error in at least one log file is disclosed. The computing device includes a processor; a memory; and a communication interface coupled to each of the processor and the memory. The processor may be configured to receive, via the communication interface, the at least one log file from at least one log store. Next, the processor may be configured to identify, using a first trained model, the at least one error in the at least one log file. Next, the processor may be configured to classify the at least one error into a first category of errors and a second category of errors. Thereafter, the processor may be configured to automatically resolve, using a second trained model, the first category of errors in the at least one log file.

In accordance with an exemplary embodiment, each of the first trained model and the second trained model corresponds to a machine learning model.

In accordance with an exemplary embodiment, the first trained model is trained by seeding a plurality of errors in an error store database and the second trained model is trained by seeding a plurality of error fixes for a plurality of known errors in an error fix store database.

In accordance with an exemplary embodiment, the processor may be configured to classify the at least one error into the first category of errors and the second category of errors based on at least one from among complexity of errors, resolution of errors, type of errors, criticality of errors, weightage of errors, availability of possible fixes of errors, past seeded errors, frequency of occurrence of errors or any combination thereof.

In accordance with an exemplary embodiment, the first category of errors includes prime errors that are resolved automatically using the second trained model.

In accordance with an exemplary embodiment, the processor may be configured to alert at least one entity in an event at least one random error occurs while resolving the first category of errors in the at least one log file.

In accordance with an exemplary embodiment, the second category of errors includes complex errors that require manual intervention for the resolution of the errors.

According to yet another aspect of the present disclosure, a non-transitory computer readable storage medium storing instructions for automatically identifying and resolving at least one error in at least one log file is disclosed. The instructions include executable code which, when executed by a processor, causes the processor to receive, via a communication interface, the at least one log file from at least one log store; identify, using a first trained model, the at least one error in the at least one log file; classify the at least one error into a first category of errors and a second category of errors; and automatically resolve, using a second trained model, the first category of errors in the at least one log file.

In accordance with an exemplary embodiment, each of the first trained model and the second trained model corresponds to a machine learning model.

In accordance with an exemplary embodiment, the first trained model is trained by seeding a plurality of errors in an error store database and the second trained model is trained by seeding a plurality of error fixes for a plurality of known errors in an error fix store database.

In accordance with an exemplary embodiment, the executable code, when executed causes the processor to classify the at least one error into the first category of errors and the second category of errors based on at least one from among complexity of errors, resolution of errors, type of errors, criticality of errors, weightage of errors, availability of possible fixes of errors, past seeded errors, frequency of occurrence of errors or any combination thereof.

In accordance with an exemplary embodiment, the executable code, when executed causes the processor to alert at least one entity in an event at least one random error occurs while resolving the first category of errors in the at least one log file.

In accordance with an exemplary embodiment, the first category of errors includes prime errors that are resolved automatically using the second trained model and, the second category of errors includes complex errors that require manual intervention for the resolution of errors.

BRIEF DESCRIPTION OF THE DRAWINGS

The present disclosure is further described in the detailed description which follows, in reference to the noted plurality of drawings, by way of non-limiting examples of exemplary embodiments of the present disclosure, in which like characters represent like elements throughout the several views of the drawings.

DETAILED DESCRIPTION

Figure 1:
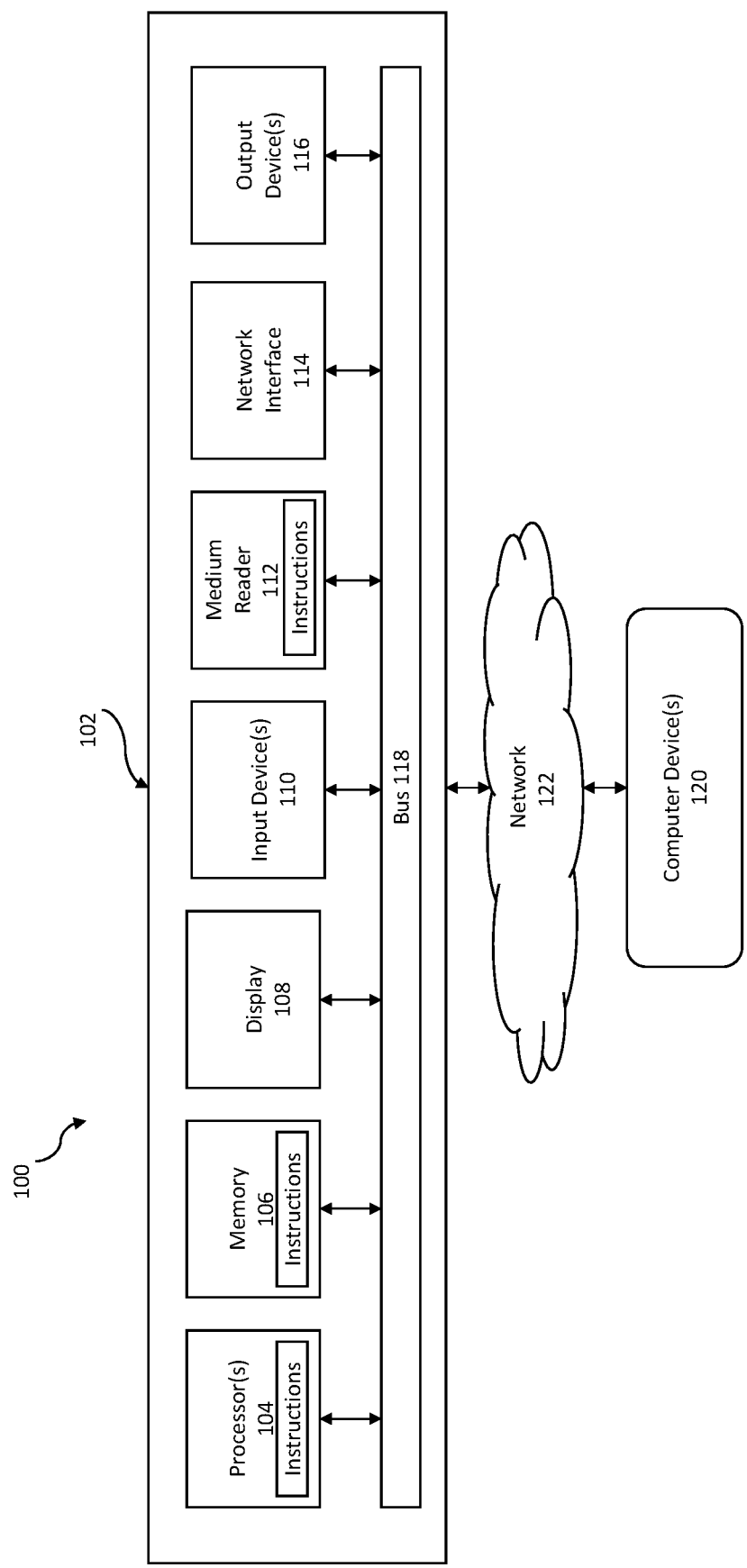
FIG. 1 illustrates an exemplary computer system for automatically identifying and resolving at least one error in at least one log file in accordance with an exemplary embodiment.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controller described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the invention. It will be apparent however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer readable storage medium having instructions stored thereon for one or more aspects of the technology as described and illustrated by way of the examples herein. The instructions in some examples include executable code that, when executed by one or more processors, cause the processors to carry out steps necessary to implement the methods of the examples of this technology that are described and illustrated herein.

To overcome problems associated with excessive consumption of time and resources by production team on commonly occurring or known errors, the present disclosure provides a method and a system for automatically identifying and resolving commonly known errors in log files using machine learning trained models. The system first receives and reads at least one log file associated with a target application. In an example, the at least one log file may be received and read by the system using path of the at least one log file or the at least one log file may be directly uploaded or collected on the system for resolution of the common & known errors. Further, the system is customized to read the at least one log file associated with any type of application. The system is capable and configured to read the at least one log file of any type and format. In an example, even if Application A has log file of type X and Application B has log file of type Y, the system is capable to read log files of both applications e.g., type X of application A and type Y of application B. Thus, the present system or device is customizable as per the type of application. The system is customized to receive and read any type of log file, any format of the log file. Further, the system may receive the at least one log file by using the path of the at least one log file, by using the source of the at least one log file, by downloading the at least one log file, receiving from a third-party platform and the like. Next, the system is configured to identify at least one error in the at least one log file using a first trained model trained. The first trained model is trained by seeding a plurality of errors in an error database or repository. The system stores the identified at least one error in the at least one log file after removing unwanted noise (such as warning errors) for fixing the errors. After identifying and storing the at least one error, the system classifies the identified at least one error into various categories (such as a first category and a second category) of the errors. For example, the system identifies five errors in the first category of errors and two errors in the second category of errors where the first category of errors are common errors and can be resolved without manual intervention while the second category of errors are complex errors and requires manual intervention for the accurate resolution/fixing of the errors. Thereafter, the system automatically resolves or fixes the common errors that do not require manual intervention (for e.g., the first category of errors) using a second trained model. The system is further configured to alert at least one entity in an event at least one random error occurs while automatically resolving the first category of errors in the at least one log file. The second model is trained by seeding a plurality of error fixes for a plurality of known errors. In a non-limiting embodiment, the system resolves the common or known errors using a supervised machine learning model. In an example, the system maps the identified common errors of the first category of errors to an error fix database with possible available solutions for such errors and accordingly implement the fixes automatically for such errors. Therefore, the present disclosure aids in freeing up the capacity of the support team to focus on new, advanced and complex errors and thus increases efficiency of the system and team to resolve a large number of complex errors in a given time period. Further, the implementation of the features of the present disclosure results in achieving a better efficiency owing to various factors as has been explained hereinbelow and which will become evident to a person skilled in the art, the factors including but not limited to automatic resolution of errors, reducing bug resolution time, increasing speed of the production process and the like.

FIG. 1 is an exemplary system for use in accordance with the embodiments described herein. The system 100 is generally shown and may include a computer system 102, which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud-based environment. Even further, the instructions may be operative in such cloud-based computing environment.

In a networked deployment, the computer system 102 may operate in the capacity of a server or as a client user computer in a server-client user network environment, a client user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As used herein, an error log is a record of at least one error that is encountered by an application, operating system or server during operation. Also, an error log can be defined as a bug in a program that causes it to operate incorrectly.

As used herein, a target application refers to an application targeted for resolution or fixing of errors in the associated log file to operate the application in a correct and desired manner.

As used herein, error store database corresponds to a database that stores a plurality of errors.

As used herein, error classification store database corresponds to a database that stores the errors which are filtered and classified into a first category of errors and a second category of errors using the features of the present disclosure.

As used herein, error fix store database stores a plurality of error fixes for a plurality of known errors.

As used herein, seeding is the process of populating the error store database with an initial set of data.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable storage medium from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. As regards the present disclosure, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but is not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet, Personal Computer (PC), a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automatically identifying and resolving errors in the log file.

Figure 2:
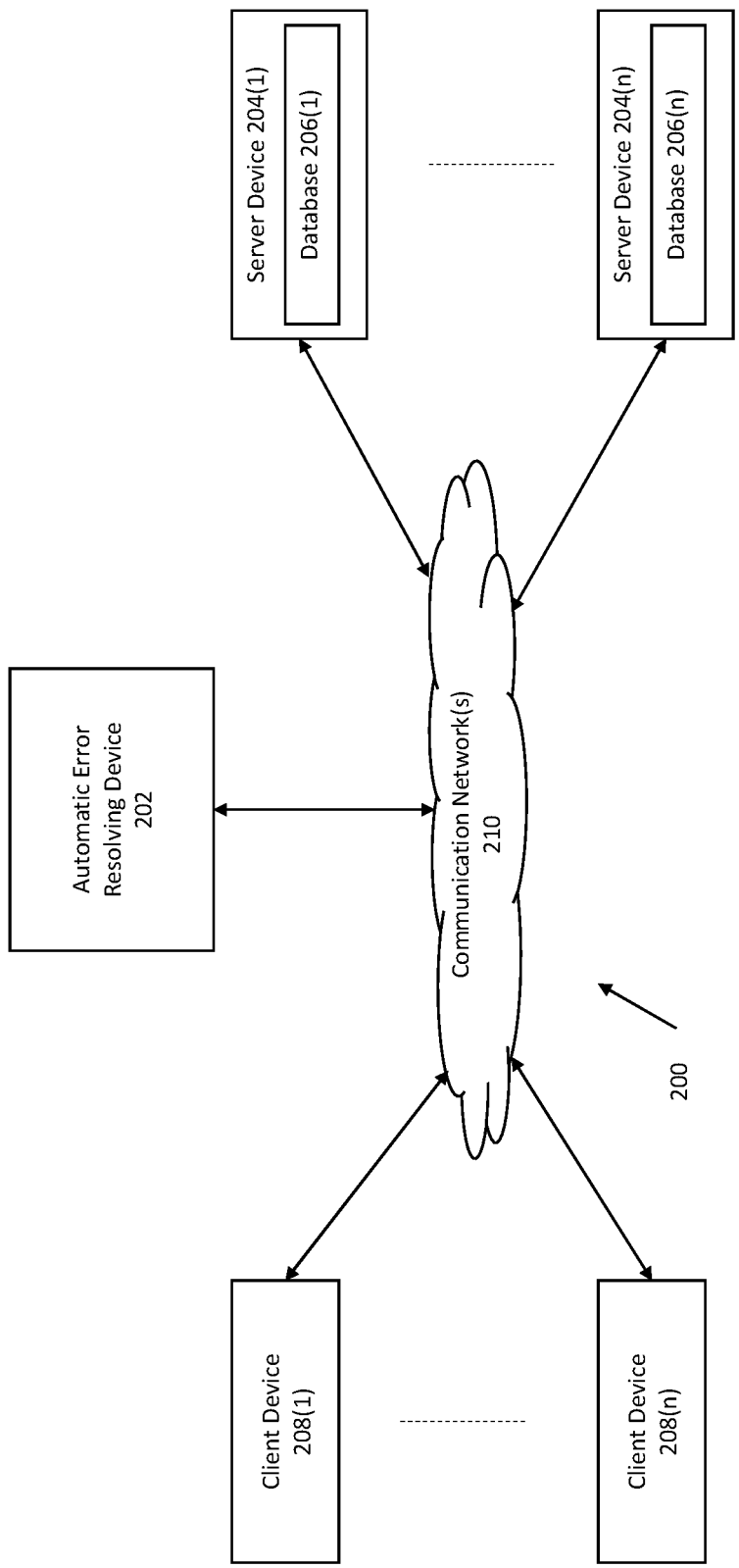
FIG. 2 illustrates an exemplary diagram of a network environment for automatically identifying and resolving at least one error in at least one log file in accordance with an exemplary embodiment.

Referring to FIG. 2, a schematic of an exemplary network environment 200 for implementing a method for automatically identifying and resolving at least one error in at least one log file using at least one trained model is illustrated. In an exemplary embodiment, the method is executable on any networked computer platform, such as, for example, a personal computer (PC).

The method for automatically identifying and resolving at least one error in the at least one log file may be implemented by an Automatic Error Resolving (AER) device 202. The AER device 202 may be the same or similar to the computer system 102 as described with respect to FIG. 1. The AER device 202 may store at least one application that can include executable instructions that, when executed by the AER device 202, cause the AER device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as virtual machine(s) or virtual server(s) that may be managed in a cloud-based computing environment. Also, the application(s), and even the AER device 202 itself, may be located in virtual server(s) running in a cloud-based computing environment rather than being tied to one or more specific physical network computing devices. Also, the application(s) may be running in one or more virtual machines (VMs) executing on the AER device 202. Additionally, in one or more embodiments of this technology, virtual machine(s) running on the AER device 202 may be managed or supervised by a hypervisor.

In the network environment 200 of FIG. 2, the AER device 202 is coupled to a plurality of server devices 204(1)-204(n) that hosts a plurality of databases 206(1)-206(n), and also to a plurality of client devices 208(1)-208(n) via communication network(s) 210. A communication interface of the AER device 202, such as the network interface 114 of the computer system 102 of FIG. 1, operatively couples and communicates between the AER device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AER device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable storage media, and AER devices that efficiently implement a method for automatically identifying and resolving the at least one error in the at least one log file based on a category/cluster of errors using the at least one trained model.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, tele traffic in any suitable form (e.g., voice, modem, and the like), Public Switched Telephone Network (PSTNs), Ethernet-based Packet Data Networks (PDNs), combinations thereof, and the like.

The AER device 202 may be a standalone device or integrated with one or more other devices or apparatuses, such as one or more of the server devices 204(1)-204(n), for example. In one particular example, the AER device 202 may include or be hosted by one of the server devices 204(1)-204(n), and other arrangements are also possible.

Moreover, one or more of the devices of the AER device 202 may be in the same or a different communication network including one or more public, private, or cloud-based networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. In an example, the server devices 204(1)-204(n) may process requests received from the AER device 202 via the communication network(s) 210 according to the Hypertext Transfer Protocol (HTTP)-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases or repositories 206(1)-206(n) that are configured to store data that relates to errors, seeded errors, seeded error fix, log files, errors categories, software programs, machine learning models.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud-based architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AER device 202 via communication network(s) 210. Accordingly, the client devices 208(1)-208(n) may be mobile computing devices, desktop computing devices, laptop computing devices, tablet computing devices, or the like, that host chat, e-mail, or voice-to-text applications, for example. In an exemplary embodiment, at least one client device 208 is a wireless mobile communication device, e.g., a smart phone.

The client devices 208(1)-208(n) may run interface applications, such as standard web browsers or standalone client applications, which may provide an interface to communicate with the AER device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AER device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AER device 202, the server devices 204(1)-204(n), or the client devices 208(1)-208(n), for example, may be configured to operate as virtual instances on the same physical machine. In other words, one or more of the AER device 202, the server devices 204(1)-204(n), or the client devices 208(1)-208(n) may operate on the same physical device rather than as separate devices communicating through communication network(s) 210. Additionally, there may be more or fewer AER devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only tele traffic in any suitable form (e.g., voice and modem), wireless traffic networks, cellular traffic networks, Packet Data Networks (PDNs), the Internet, intranets, and combinations thereof.

Figure 3:
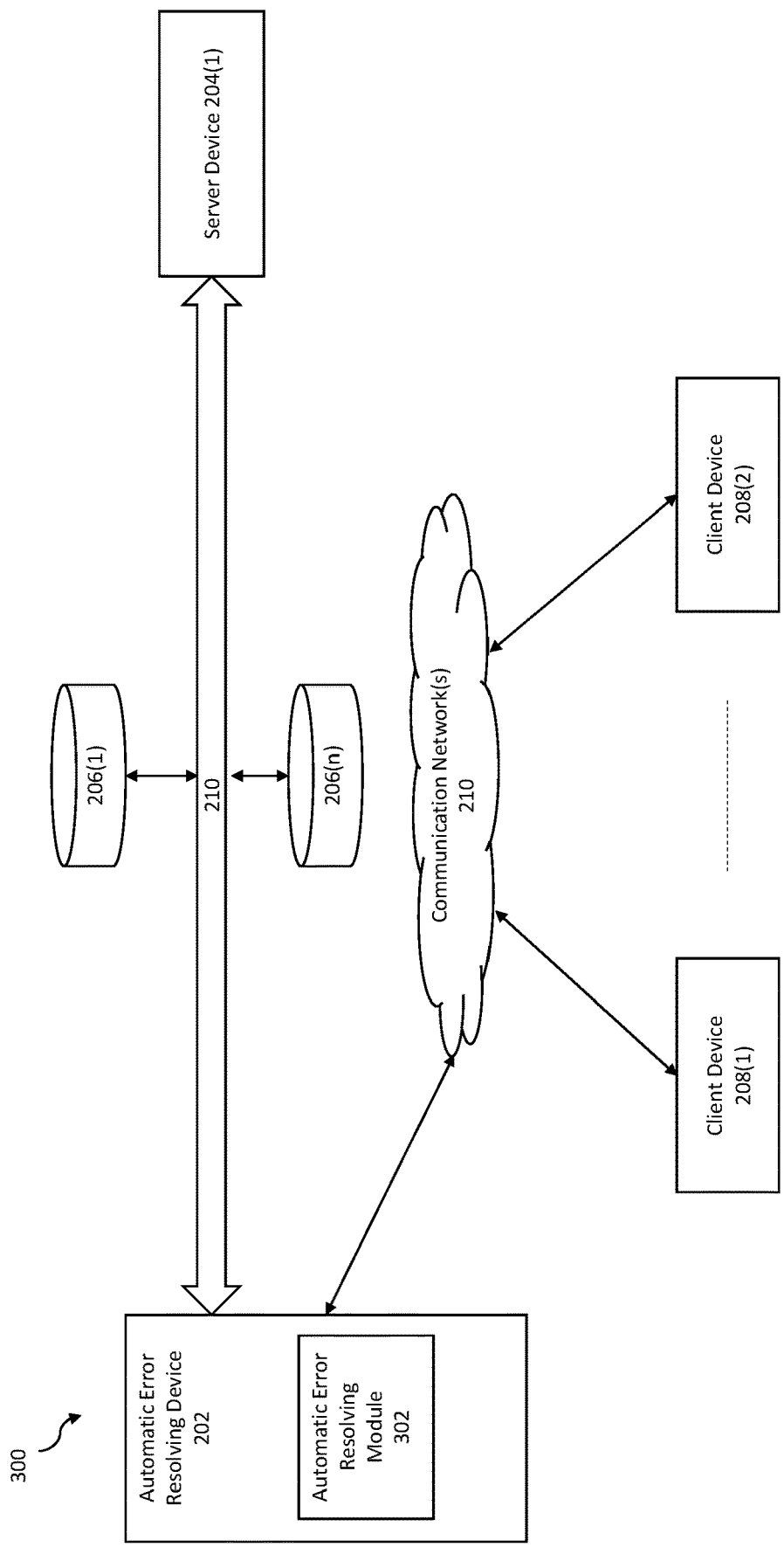
FIG. 3 illustrates an exemplary system for implementing a method for automatically identifying and resolving at least one error in at least one log file, in accordance with exemplary embodiment.

FIG. 3 illustrates an exemplary system for implementing a method for automatically identifying and resolving at least one error in at least one log file using at least one trained model, in accordance with an exemplary embodiment. As illustrated in FIG. 3, according to exemplary embodiments, the system 300 may include an AER device 202 including an Automatic Error Resolving (AER) module 302 that may be connected to a server device 204(1) and one or more repository from the repositories 206(1) . . . 206(n) via a communication network 210, but the disclosure is not limited thereto.

The AER device 202 is described and shown in FIG. 3 as including an AER module 302, although it may include other rules, policies, modules, databases, or applications, for example. As will be described below, the AER module 302 is configured to implement a method for automatically identifying and resolving the at least one error in the at least one log file using the at least one trained model.

An exemplary process 300 for implementing a mechanism for automatically identifying and resolving the at least one error in the at least one log file using the at least one trained model by utilizing the network environment of FIG. 2 is shown as being executed in FIG. 3. Specifically, a first client device 208(1) and a second client device 208(2) are illustrated as being in communication with AER device 202. In this regard, the first client device 208(1) and the second client device 208(2) may be "clients" of the AER device 202 and are described herein as such. Nevertheless, it is to be known and understood that the first client device 208(1) and/or the second client device 208(2) need not necessarily be "clients" of the AER device 202, or any entity described in association therewith herein. Any additional or alternative relationship may exist between either or both of the first client device 208(1) and the second client device 208(2) and the AER device 202, or no relationship may exist.

Further, the AER device 202 is illustrated as being able to access the one or more repositories 206(1) . . . 206(n). The AER module 302 may be configured to access these repositories/databases for implementing a method for providing automatic identification of the at least one error and resolution of prime (e.g., a first category of errors) errors in the at least one log file.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both the first client device 208(1) and the second client device 208(2) may communicate with the AER device 202 via broadband or a cellular communication. Of course, these embodiments are merely exemplary and are not limiting or exhaustive.

Figure 4:
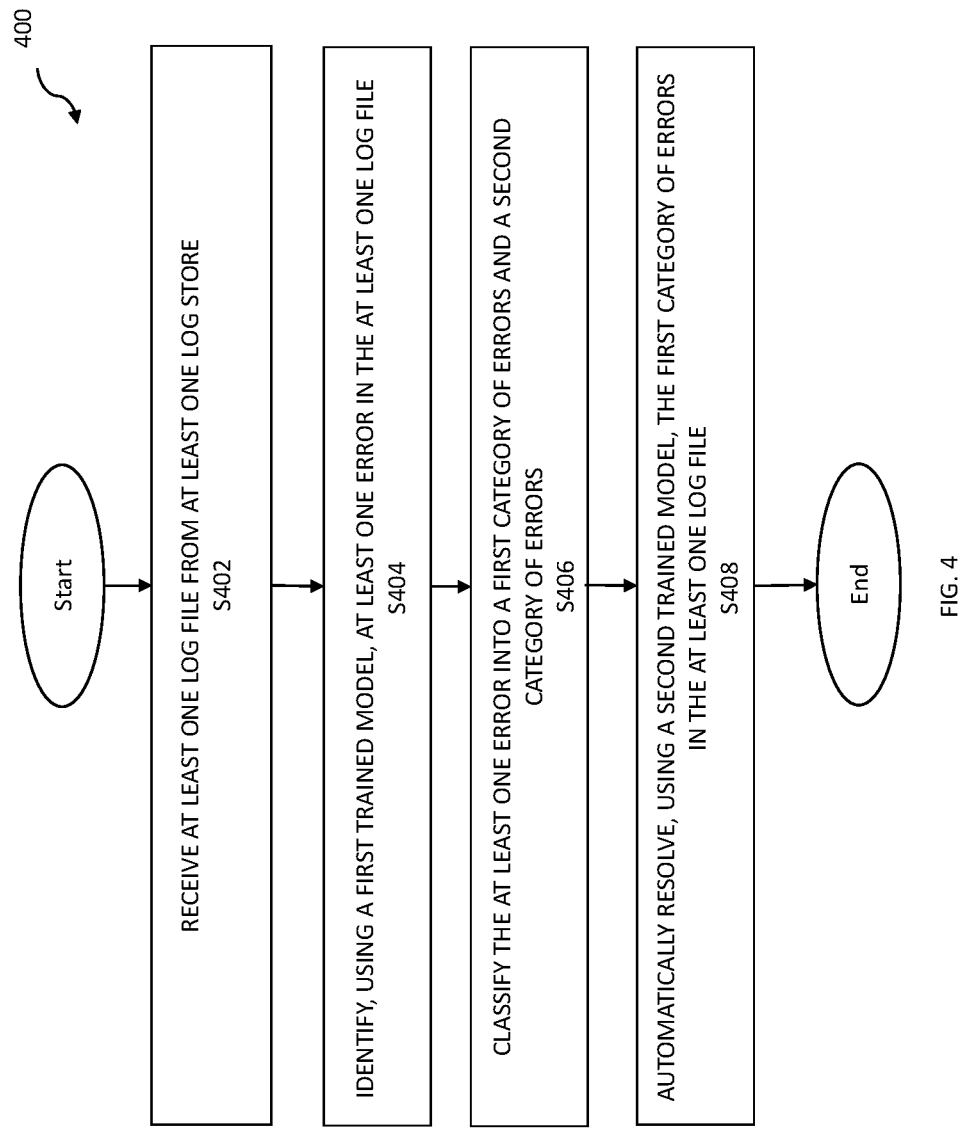
FIG. 4 illustrates an exemplary method flow diagram for automatically identifying and resolving at least one error in at least one log file, in accordance with exemplary embodiment.

FIG. 4 illustrates an exemplary method 400 for automatically identifying and resolving at least one error in at least one log file, in accordance with exemplary embodiment. As shown in FIG. 4, the method begins following a need to resolve the at least one error in the at least one log file of a target application arises.

At step S402, the method includes receiving, by the at least one processor 104 via a communication interface 114, the at least one log file from the at least one log store. In an exemplary embodiment, the at least one log store includes the at least one log file associated with various applications available on premises, on data syntax, or on the server. In another non-limiting embodiment, the at least one log store may include the at least one log file associated with cloud-based applications. The at least one log file is received and read by the at least one processor 104 for identification and resolution of prime errors in the at least one log file. Further, the at least one log file may be received at the at least one processor by directly using the path of the at least one log file, by logging collector, by using any log retrieving technique and the like. Also, the at least one log file received at the at least one processor may be of any type or any format.

At step S404, the method includes identifying, by the at least one processor 104 using a first trained model, the at least one error in the at least one log file. In a non-limiting embodiment, the first trained model corresponds to a supervised machine learning model. In an exemplary embodiment, machine learning may include supervised learning algorithms such as, for example, k-medoids analysis, regression analysis, decision tree analysis, random forest analysis, k-nearest neighbors' analysis, logistic regression analysis, K-fold cross-validation analysis, balanced class weight analysis, and the like. The first model is trained by seeding a plurality of errors in an error store database. Thus, the at least one error identified in the at least one log file is mapped to the errors stored in the error store database to remove or filter out noise (such as warning errors) and then the filtered errors are further stored in an error classification store database for further processing. Further, the high-priority errors are seeded into the error store database on a real-time basis to increase the data associated with the plurality of errors. As used herein, the high-priority errors refer to the errors identified by the support team in various log files based on their past interaction and experience with such errors. In a non-limiting embodiment, the at least one error in the at least one log file may be identified using an unsupervised machine learning model.

At step S406, the method includes, classifying, by the at least one processor 104, the identified at least one error into a first category of errors and a second category of errors. In a non-limiting embodiment, the at least one error is automatically classified into the first category (also referred to as a first cluster) of errors and the second category (also referred to as a second cluster) of errors based on at least one from among complexity of errors, resolution of errors, type of errors, criticality of errors, weightage of errors, availability of possible fixes of errors, past seeded errors, frequency of occurrence of errors. To handle a large number of errors in the at least one log file, classification of the at least one identified error is performed automatically by the at least one processor 104 using the at least one trained machine learning model. In an exemplary embodiment, the classification (clustering) of the at least one identified error is performed using a Decision Tree algorithm. The first category of errors includes prime errors that do not need manual intervention for the resolution of errors and are resolved automatically using a second trained model. The second category of errors includes complex errors that require manual intervention for resolution or fixing of the errors. In a non-limiting embodiment, classification of the at least one error into the first category of errors and the second category of errors may also be performed using an unsupervised machine learning model.

At step S408, the method includes automatically resolving, by the at least one processor 104 using the second trained model, the first category of errors in the at least one log file. The second trained model is trained by seeding a plurality of error fixes for a plurality of known errors in an error fix store database. Thus, the errors identified in the first category of errors are mapped to errors available in the error fix store database to read available fixes for the errors and then the corresponding error fixes are applied automatically in the at least one log file to remove and resolve the known errors in the at least one log file. The first category of errors includes commonly known errors or commonly occurring errors. In a non-limiting embodiment, the method further includes a step of alerting, by the at least one processor 104, at least one entity in an event at least one random error occurs while resolving the first category of errors in the at least one log file. In an example, the at least one entity may include at least one user associated with an error resolution team. In another example, the at least one entity may include an error resolution platform. The at least one random error may correspond to occurrence of a constraint or hindrance at the time of applying the corresponding error fixes to at least one error to the first category of errors. In an embodiment, alerting the at least one user facilitates manual check and verification of the error fix applied to the at least one error to the first category of errors to expedite the resolution of the at least one error. In an example, a low strength of internet connectivity may hinder the automatic resolution to the first category of errors in the at least one log file. In a non-limiting embodiment, the method may further include alerting the at least one entity in an event the at least one random error occurs while resolving the second category of errors in the at least one log file.

Figure 5:
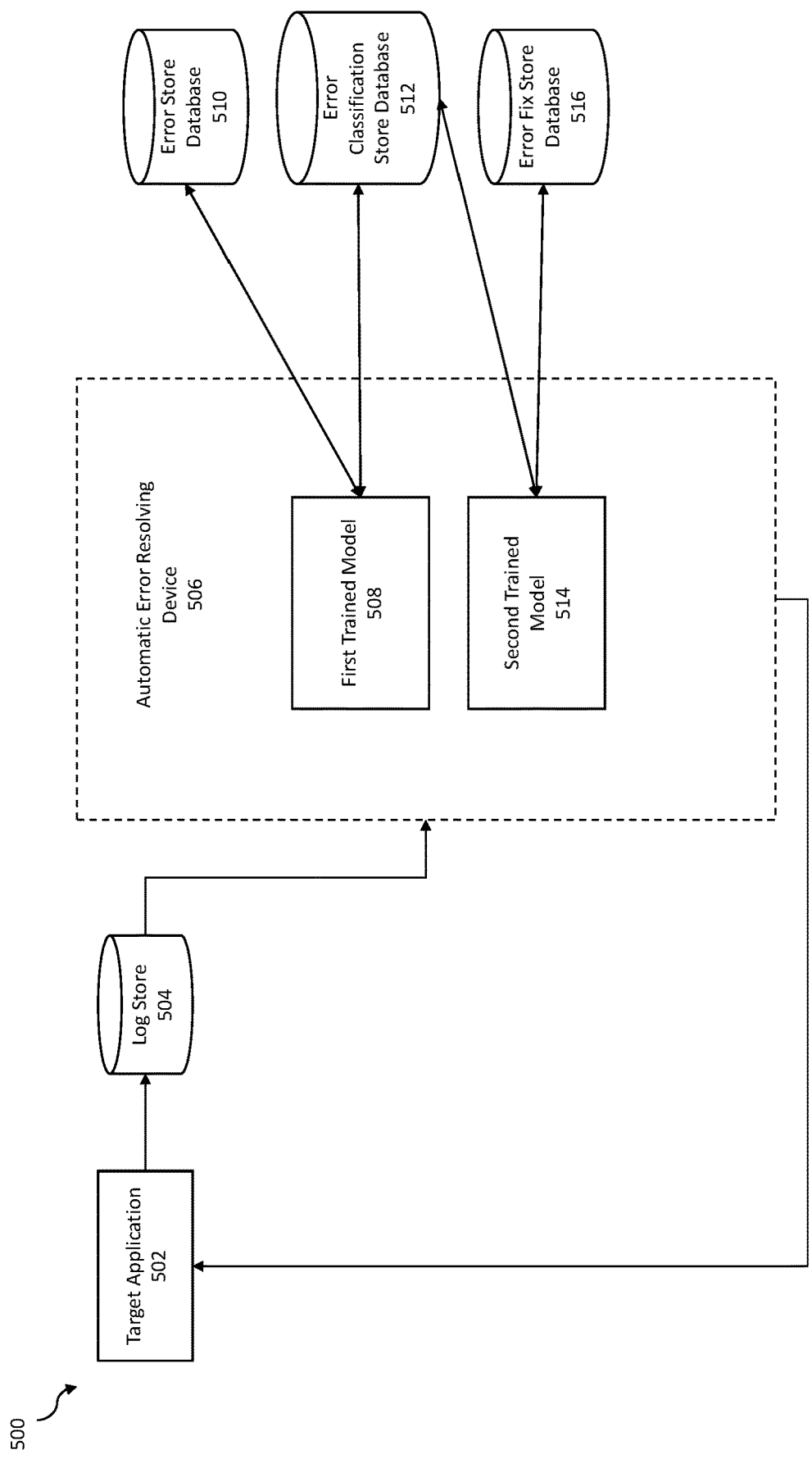
FIG. 5 illustrates a process flow diagram usable for implementing a method for automatically identifying, analyzing, and resolving/fixing at least one error in at least one log file, in accordance with exemplary embodiment.

FIG. 5 illustrates a process flow diagram for automatically identifying, analyzing, and resolving at least one error in at least one log file, according to an exemplary embodiment. As illustrated in FIG. 5, the process flow 500 begins with receiving the at least one log file associated with a target application 502. The at least one log file is stored in the log store 504. In an example, the at least one log file associated with the target application in any customize/parameterize log format may be read via customize/parametrize log location. The process flow relies upon an Automatic Error Resolving (AER) device 506 for automatic identification, analysis, and resolution of the at least one error in the at least one log file. The AER device 506 may include a first trained model 508, a second trained model 514, and at least one processor to provide resolution of the at least one error in the at least one log file. In a non-limiting embodiment, the first trained model 508 and the second trained model 514 may be present outside the AER device to implement the features of the present disclosure.

The first trained model 508 is trained by seeding a plurality of errors in an error store database 510. The first trained model is trained to facilitate the identification of at least one error in the at least one log file. More particularly, the first trained model filters out and identifies relevant and top count errors in the at least one log file. After filtering, the identified at least one error is stored in an error classification store database 512 for resolution of the identified at least one error. Next, the process flow moves to a step of analyzing and classifying the identified at least one error in the error classification store database 512 using the AER device 506 into various categories of errors such as a first category of errors and a second category of errors. The at least one error is classified into the first category of errors and the second category of errors based on at least one from among complexity of errors, resolution of errors, type of errors, criticality of errors, weightage of errors, availability of possible fixes of errors, past seeded errors, frequency of occurrence of errors. The first category of errors may include prime errors that are resolved automatically using a second trained model 514 and do not require manual intervention. The second trained model 514 is responsible for mapping the first category of errors with the corresponding fix or solution stored in an error fix store database 516. After identifying the corresponding solution for the first category of errors, the process flow moves to the step of automatically resolving the second category of errors associated with the at least one log file of the target application 502 using the corresponding solution from the error fix store database 516. In a non-limiting embodiment, the data fixes and incident fixes may also be performed using the features of the present disclosure. In another non-limiting embodiment, code fixes may also be performed using the features of the disclosure.

In an example, the user tries to launch an application; however, the user encounters an error H. Instead of troubleshooting the error H with the production support team, the method and system of the present disclosure may help the user in getting the quick resolution of the error H using at least one trained machine learning model. Thus, the error H in the application log file that occurred during the operation of the application gets resolved quickly and automatically without any manual intervention and saves the time of the production team dealing with complex errors and the second category of errors only.

Accordingly, with this technology, an optimized process for automatically identifying and resolving the at least one error in the at least one log file of an application is disclosed. As evident from the above disclosure, the present solution provides significant technical advancement over the existing solutions by automatically identifying and resolving the at least one error in the application log files by using at least one trained model. Further, the automatic resolution of common and known errors in the application log files saves a significant amount of time for the production support team of any organization which can be used in resolving complex issues/errors. Therefore, as disclosed, the present disclosure is helpful and increases the efficiency of the system and production support team.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable storage medium may be described as a single medium, the term "computer-readable storage medium" includes a single medium or multiple media, such as a centralized or distributed database, and/or associated caches and servers that store one or more sets of instructions. The term "computer-readable storage medium" shall also include any medium that is capable of storing, encoding or carrying a set of instructions for execution by a processor or that causes a computer system to perform any one or more of the embodiments disclosed herein.

The computer-readable medium may comprise a non-transitory computer-readable storage medium or media and/or comprise a transitory computer-readable storage medium or media. In a particular non-limiting, exemplary embodiment, the computer-readable storage medium can include a solid-state memory such as a memory card or other package that houses one or more non-volatile read-only memories. Further, the computer-readable storage medium can be a random-access memory or other volatile re-writable memory. Additionally, the computer-readable storage medium can include a magneto-optical or optical medium, such as a disk or tapes or other storage device to capture carrier wave signals such as a signal communicated over a transmission medium. Accordingly, the disclosure is considered to include any computer-readable storage medium or other equivalents and successor media, in which data or instructions may be stored. According to an aspect of the present disclosure, a non-transitory computer-readable storage medium storing instructions for automatically identifying and resolving at least one error in at least one log file is disclosed. The instructions include executable code which, when executed by a processor, causes the processor to receive, via a communication interface, the at least one log file from the at least one log store; identify, using a first trained model, the at least one error in the at least one log file; classify the at least one error into a first category of errors and a second category of errors; automatically resolve, using a second trained model, the first category of errors in the at least one log file.

In an exemplary embodiment, the first trained model and the second trained model correspond to a machine learning model. In an exemplary embodiment, the first trained model is trained by seeding a plurality of errors in an error store database and the second trained model is trained by seeding a plurality of error fixes for a plurality of known errors in an error fix store database. The at least one error is classified into a first category of errors and a second category of errors based on at least one from among complexity of errors, resolution of errors, type of errors, criticality of errors, weightage of errors, availability of possible fixes of errors, past seeded errors, frequency of occurrence of errors. The first category of errors includes prime errors that are resolved automatically using the second trained model. The second category of errors includes complex errors that require manual intervention for the resolution of the errors.

In an exemplary embodiment, the executable code, when executed causes the processor to alert at least one entity in an event at least one random error occurs while resolving the first category of errors in the at least one log file.

Although the present application describes specific embodiments which may be implemented as computer programs or code segments in computer-readable storage medium, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically identifying and resolving at least one error in at least one log file, the method being implemented by at least one processor, the method comprising:
   receiving, by the at least one processor via a communication interface, the at least one log file from at least one log store;
   training a first model by seeding a plurality of errors in an error store database;
   training a second trained model by seeding a plurality of error fixes for a plurality of known errors in an error fix store database;
   identifying, by the at least one processor using the first trained model, the at least one error in the at least one log file;
   mapping, by using the first trained model, the at least one error identified in the at least one log file to errors stored in the error store database to filter out noise and then the filtered errors are further stored in an error classification store database for resolving the at least one identified error;
   classifying, by the at least one processor, the at least one error into a first category of errors and a second category of errors;
   mapping, by using the second trained model, the first category of errors with corresponding fix stored in the error fix store database; and
   automatically resolving, by the at least one processor using the second trained model, the first category of errors in the at least one log file.

2. The method as claimed in claim 1, wherein each of the first trained model and the second trained model corresponds to a machine learning model.

3. The method as claimed in claim 1, wherein the at least one error is classified into the first category of errors and the second category of errors based on at least one from among complexity of errors, resolution of errors, type of errors, criticality of errors, weightage of errors, availability of possible fixes of errors, past seeded errors, frequency of occurrence of errors or any combination thereof.

4. The method as claimed in claim 1, wherein the first category of errors comprises prime errors that are resolved automatically using the second trained model.

5. The method as claimed in claim 1, wherein the method includes alerting, by the at least one processor, at least one entity in an event at least one random error occurs while resolving the first category of errors in the at least one log file.

6. The method as claimed in claim 1, wherein the second category of errors comprises complex errors that require manual intervention for the resolution of errors.

7. A computing device configured to implement an execution of a method for automatically identifying and resolving at least one error in at least one log file, the computing device comprising:
- a processor;
- a memory; and
- a communication interface coupled to each of the processor and the memory,
- wherein the processor is configured to:
  - receive, via the communication interface, the at least one log file from at least one log store;
  - train a first model by seeding a plurality of errors in an error store database;
  - train a second trained model by seeding a plurality of error fixes for a plurality of known errors in an error fix store database;
  - identify, using the first trained model, the at least one error in the at least one log file;
  - map, by using the first trained model, the at least one error identified in the at least one log file to errors stored in the error store database to filter out noise and then the filtered errors are further stored in an error classification store database for resolving the at least one identified error;
  - classify the at least one error into a first category of errors and a second category of errors;
  - map, by using the second trained model, the first category of errors with corresponding fix stored in the error fix store database; and
  - automatically resolve, using the second trained model, the first category of errors in the at least one log file.

8. The computing device as claimed in claim 7, wherein each of the first trained model and the second trained model corresponds to a machine learning model.

9. The computing device as claimed in claim 7, wherein the processor is configured to classify the at least one error into the first category of errors and the second category of errors based on at least one from among complexity of errors, resolution of errors, type of errors, criticality of errors, weightage of errors, availability of possible fixes of errors, past seeded errors, frequency of occurrence of errors or any combination thereof.

10. The computing device as claimed in claim 7, wherein the first category of errors comprises prime errors that are resolved automatically using the second trained model.

11. The computing device as claimed in claim 7, wherein the processor is further configured to alert at least one entity in an event at least one random error occurs while resolving the first category of errors in the at least one log file.

12. The computing device as claimed in claim 7, wherein the second category of errors comprises complex errors that require manual intervention for the resolution of errors.

13. A non-transitory computer readable storage medium storing instructions for automatically identifying and resolving at least one error in at least one log file, the instructions comprising executable code which, when executed by a processor, causes the processor to:
- receive, via a communication interface, the at least one log file from at least one log store;
- train a first model by seeding a plurality of errors in an error store database;
- train a second trained model by seeding a plurality of error fixes for a plurality of known errors in an error fix store database;
- identify, using the first trained model, the at least one error in the at least one log file;
- map, by using the first trained model, the at least one error identified in the at least one log file to errors stored in the error store database to filter out noise and then the filtered errors are further stored in an error classification store database for resolving the at least one identified error;
- classify the at least one error into a first category of errors and a second category of errors;
- map, by using the second trained model, the first category of errors with corresponding fix stored in the error fix store database; and
- automatically resolve, using the second trained model, the first category of errors in the at least one log file.

14. The storage medium as claimed in claim 13, wherein each of the first trained model and the second trained model corresponds to a machine learning model.

15. The storage medium as claimed in claim 13, wherein when executed by the processor, the exec E table code further causes the processor to classify the at least one error into the first category of errors and the second category of errors based on at least one from among complexity of errors, resolution of errors, type of errors, criticality of errors, weightage of errors, availability of possible fixes of errors, past seeded errors, frequency of occurrence of errors or any combination thereof.

16. The storage medium as claimed in claim 13, wherein when executed by the processor, the executable code further causes the processor to alert at least one entity in an event at least one random error occurs while resolving the first category of errors in the at least one log file.

17. The storage medium as claimed in claim 13, wherein the first category of errors comprises prime errors that are resolved automatically using the second trained model, and the second category of errors comprises complex errors that require manual intervention for the resolution of errors.

* * * * *